(12) United States Patent
Gong et al.

(10) Patent No.: US 11,531,349 B2
(45) Date of Patent: Dec. 20, 2022

(54) CORNER CASE DETECTION AND COLLECTION FOR A PATH PLANNING SYSTEM

(71) Applicants: VOLKSWAGEN AG, Wolfsburg (DE); AUDI AG, Ingolstadt (DE); PORSCHE AG, Stuttgart (DE)

(72) Inventors: Xinwei Gong, Mountain View, CA (US); Sai Prasad Nooka, Foster City, CA (US)

(73) Assignees: Volkswagen AG; Audi AG; Porsche AG

( * ) Notice: Subject to any disclaimer, the term of this patent is extended or adjusted under 35 U.S.C. 154(b) by 699 days.

(21) Appl. No.: 16/448,070

(22) Filed: Jun. 21, 2019

(65) Prior Publication Data

US 2020/0401149 A1    Dec. 24, 2020

(51) Int. Cl.
*G06F 11/07* (2006.01)
*G06N 3/04* (2006.01)
*G05D 1/02* (2020.01)

(52) U.S. Cl.
CPC ....... *G05D 1/0221* (2013.01); *G06F 11/0739* (2013.01); *G06N 3/0454* (2013.01); *G05D 2201/0213* (2013.01)

(58) Field of Classification Search
CPC ............. G06F 11/0736; G06F 11/0739; G06F 16/9024; G05D 1/0221; G05D 2201/0213; G05D 2201/0214; G05D 2201/0212; G05D 1/0088; G06N 3/0454; G01C 21/3446
USPC .......................................................... 701/23
See application file for complete search history.

(56) References Cited

U.S. PATENT DOCUMENTS

| | | | |
|---|---|---|---|
| 2013/0073113 A1* | 3/2013 | Wang ..................... | B60W 20/11 701/1 |
| 2013/0271602 A1* | 10/2013 | Bentley .................. | G06V 40/25 348/143 |
| 2015/0266455 A1* | 9/2015 | Wilson ................. | G08G 1/0133 701/93 |
| 2018/0148051 A1* | 5/2018 | Lujan .................... | G05D 1/0214 |
| 2018/0150080 A1* | 5/2018 | Gross ................... | G05D 1/0217 |
| 2018/0308202 A1* | 10/2018 | Appu ..................... | G06N 3/063 |
| 2018/0374341 A1 | 12/2018 | Branson et al. | |
| 2018/0374359 A1 | 12/2018 | Li et al. | |
| 2019/0034794 A1 | 1/2019 | Ogale et al. | |
| 2019/0049968 A1* | 2/2019 | Dean .................. | B60W 60/0011 |

(Continued)

FOREIGN PATENT DOCUMENTS

WO    2018232680 A1    12/2018

OTHER PUBLICATIONS

Search Report and Written Opinion for International Patent Application No. PCT/EP2020/066675; dated Oct. 7, 2020.

*Primary Examiner* — Yazan A Soofi
(74) *Attorney, Agent, or Firm* — Barnes & Thornburg, LLP

(57) ABSTRACT

In a predictive path planning functionality for a transportation vehicle data describing a roadway are acquired by one or more sensors disposed on the transportation vehicle and analyzed. One or more predicted paths are predicted with at least one neural network. Data describing a reference path taken by the transportation vehicle are acquired. The one or more predicted paths are evaluated to detect one or more errors in the predicting operation wherein the one or more errors include an indication that the one or more predicted paths of the path planning system deviate from the reference path.

22 Claims, 4 Drawing Sheets

(56) References Cited

U.S. PATENT DOCUMENTS

| | | | |
|---|---|---|---|
| 2019/0072978 A1 | 3/2019 | Levi | |
| 2019/0258251 A1* | 8/2019 | Ditty | G06V 20/58 |
| 2019/0265714 A1* | 8/2019 | Ball | G05D 1/0236 |
| 2019/0283746 A1* | 9/2019 | Shalev-Shwartz | B60W 40/08 |
| 2019/0369637 A1* | 12/2019 | Shalev-Shwartz | G01C 21/3492 |
| 2019/0384303 A1* | 12/2019 | Muller | G01C 21/3407 |
| 2019/0384304 A1* | 12/2019 | Towal | G06V 10/82 |
| 2020/0401149 A1* | 12/2020 | Gong | G06N 3/0454 |
| 2022/0315027 A1* | 10/2022 | Behring | B60K 35/00 |

* cited by examiner

CORNER CASE DETECTION AND COLLECTION FOR A PATH PLANNING SYSTEM

CROSS-REFERENCE TO RELATED APPLICATIONS

None

FIELD

The present disclosure relates to method operations and equipment for use in detecting errors in predictive algorithms.

SUMMARY

Disclosed embodiments provide systems and methods for detecting and storing information describing errors in a predictive path planning functionality of a neural network.

In accordance with at least some disclosed embodiments, systems, components, and methodologies, predictive functions of the predictive algorithms (e.g., neural networks) are tested and errors are identified.

In accordance with at least some disclosed embodiments, information detailing the conditions surrounding the error may be collected, buffered, and recorded in a semi-permanent memory.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

Figure 1:
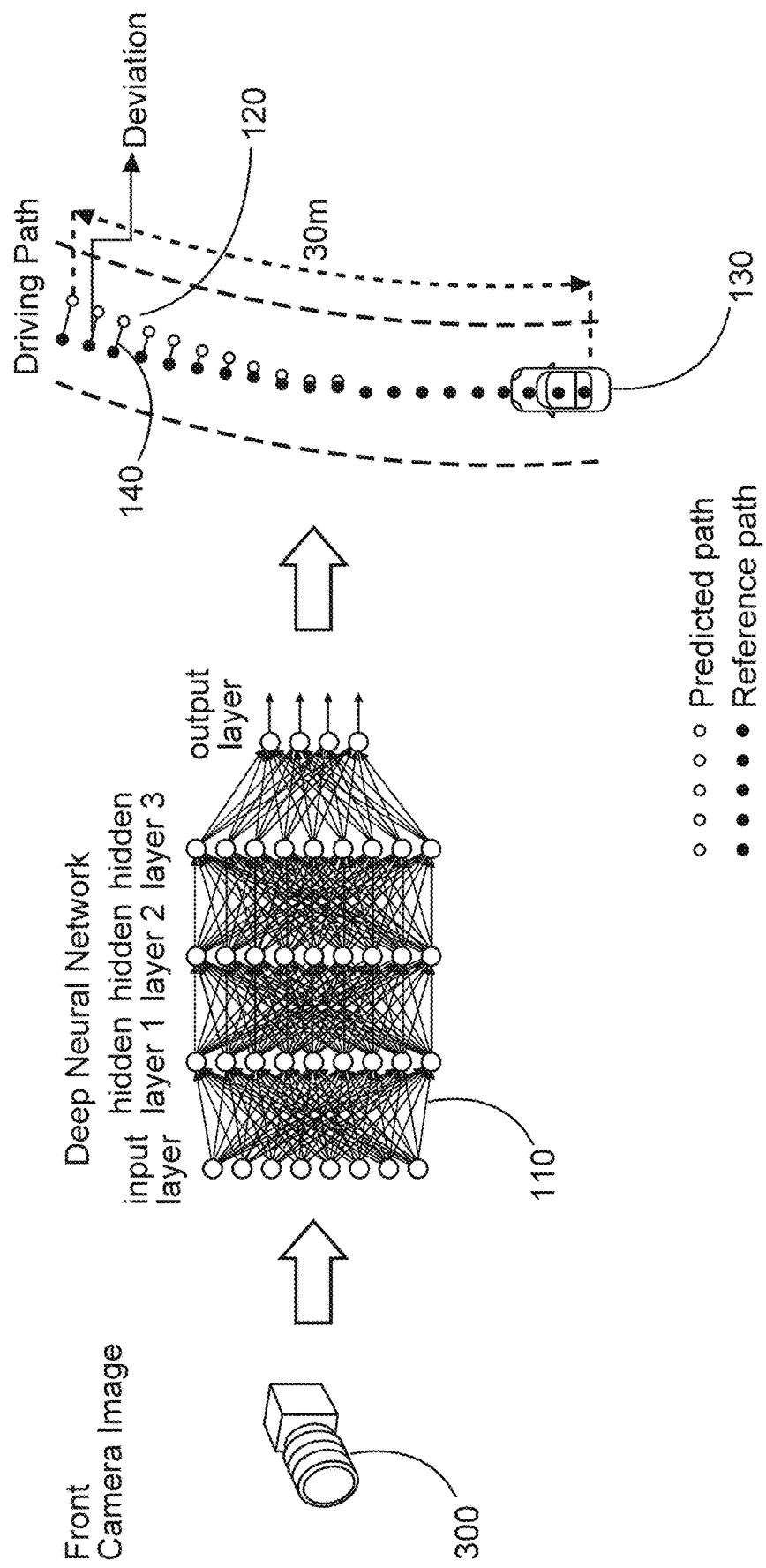
FIG. 1 illustrates a sensor, path predicting neural network, and a predicted path for an autonomous driving transportation vehicle.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

It may be difficult to identify errors produced during the operation of a neural network and/or other predictive algorithms. Further, capturing such errors and the conditions leading to and resulting from the error instances may serve a valuable function in the iterative development of neural networks.

Predictive algorithms, often used in connection with autonomous transportation vehicles, may be trained by providing predicted paths for the transportation vehicle while the transportation vehicle is operated by a human driver. In accordance with at least some disclosed embodiments, systems, components, and methodologies, predictive functions of the predictive algorithms (e.g., neural networks) are tested and errors are identified. Further, information detailing the conditions surrounding the error are collected, buffered, and recorded in a semi-permanent memory.

Disclosed embodiments provide a technical solution for detecting errors and improving predictive algorithms, often used in connection with autonomous transportation vehicles. Such predictive algorithms, such as neural networks, may be trained by providing predicted paths for the transportation vehicle while the transportation vehicle is operated by a human driver followed by a comparison between the predicted path and the path taken by the driver shortly thereafter.

For the purpose of this disclosure, the term "roadway" includes any road, thoroughfare, route, or way on land between two places that has been paved or otherwise improved to allow travel by a transportation vehicle including, but not limited to, a motor vehicle or other transportation vehicle including one or more wheels. Thus, it should be understood that such roadways may include one or more lanes and junctions with other roadways including on/off ramps, merge areas, etc., that may be included in parkways, avenues, boulevards, freeways, tollways, interstates, highways, or primary, secondary, or tertiary local roads.

For the purposes of this disclosure, the term "on-road localization" is used to refer to the ability to determine a position of the transportation vehicle relative to the roadway, or a portion of a roadway such as a lane, on which the transportation vehicle is travelling.

With the further incorporation of autonomous and driver assistance-related transportation vehicle technologies, it is envisioned that, in implementation, autonomous and/or assistive functionality will rely at least partially, and potentially fully, on on-road localization performed in an automated or semi-automated manner based on Global Positioning Service (GPS) data, data generated by a plurality of sensors located on-vehicle, and machine learning algorithms and/or neural networks operatively coupled to the plurality of sensors and/or GPS for processing and interpreting such data to facilitate on-road localization. Various conventional approaches are known for developing and training neural networks to execute on-road localization using various different types of sensors and various different types of feedback.

For the purposes of this disclosure, the phrase "autonomous and/or assistive functionality" refers to functionality that enables the partial, full, or complete automation of vehicular control ranging and encompassing what has presently come to be known as the five levels of driving automation. Thus, it should be understood that autonomous and/or assistive functionality refers to operations performed by a vehicle in an automated manner by on-vehicle equipment or the output of alerts, prompts, recommendations, and/or directions to a user, wherein these outputs are generated in an automated manner by on-vehicle equipment. Moreover, autonomous and/or assistive functionality may include driver assistance functionality (level one) wherein on-vehicle equipment assists with, but does not control, steering, braking and/or acceleration, but a driver ultimately controls accelerating, braking, and monitoring of a vehicle surroundings.

It should be understood, therefore, that such autonomous and/or assistive functionality may also include lane departure warning systems which provide a mechanism to warn a driver when a transportation vehicle begins to move out of its lane (unless a turn signal is on in that direction) on freeways and arterial roads. Such systems may include those that warn the driver (Lane Departure Warning) if the vehicle is leaving its lane (visual, audible, and/or vibration warnings) and, if no action is taken, automatically take operations to ensure the vehicle stays in its lane (Lane Keeping System).

Likewise, autonomous and/or assistive functionality may include partial automation (level two), wherein the transportation vehicle assists on steering or acceleration functions and correspondingly monitoring vehicle surroundings to enable a driver to disengage from some tasks for driving the transportation vehicle. As understood in the automotive industry, partial automation still requires a driver to be ready to assume all tasks for transportation vehicle operation and also to continuously monitor the vehicle surroundings at all times.

Autonomous and/or assistive functionality may include conditional automation (level three), wherein the transportation vehicle equipment is responsible for monitoring the vehicle surroundings and controls steering, braking, and acceleration of the vehicle without driver intervention. It should be understood that, at this level and above, the on-vehicle equipment for performing autonomous and/or assistive functionality will be interfacing with or include navigational functionality so that the components have data to determine where the vehicle is to travel. At level three and above, a driver is theoretically permitted to disengage from monitoring vehicle surroundings but may be prompted to take control of the transportation vehicle operation under certain circumstances that may preclude safe operation in a conditional automation mode.

Thus, it should be understood that autonomous and/or assistive functionality may include systems that take over steering and/or maintain the transportation vehicle relatively centered in the lane of traffic. Likewise, autonomous and/or assistive functionality may include high automation (level four) and complete automation (level five), wherein on-vehicle equipment enables automated steering, braking, and accelerating, in response to monitoring of the surroundings of the vehicle in an automated manner without driver intervention.

Therefore, it should be understood that autonomous and/or assistive functionality may require monitoring of surroundings of a vehicle including the vehicle roadway as well as identification of objects in the surroundings so as to enable safe operation of the vehicle in response to traffic events and navigational directions, wherein that safe operation requires determining when to change lanes, when to change directions, when to change roadways (exit/enter roadways), when and in what order to merge or traverse a roadway junction, and when to use turn signals and other navigational indicators to ensure other vehicles/vehicle drivers are aware of upcoming vehicle maneuvers.

Further, it should be understood that high and full automation may include analysis and consideration of data provided from off-vehicle sources in order to make determinations of whether such levels of automation are safe. For example, autonomous and/or assistive functionality at such levels may involve determining the likelihood of pedestrians in the surroundings of a transportation vehicle, which may involve referencing data indicating whether a present roadway is a highway or parkway. Additionally, autonomous and/or assistive functionality at such levels may involve accessing data indicating whether there is a traffic jam on the present roadway.

Conventional transportation vehicle navigation systems, as well as, conventional autonomous vehicles use GPS technology for their on-road localization. However, a deficiency of conventional use of global localization using GPS is that localization is limited to a certain level of accuracy, more specifically 5-10 meters in the best case (which typically requires a geographical area that provides an unobstructed, open view to the sky). Moreover, lower accuracy is much more likely in geographical areas that include relatively large buildings, trees, or geographic contours such as canyons. This is because GPS based location services require signals from GPS satellites. Dense materials, for example, rock, steel, etc.), tall buildings, and large geographical terrain features may block or degrade GPS signals.

Therefore, GPS has been conventionally combined with local landmarks for on-road localization, for example, lane markings to improve the ability for a vehicle with autonomous and/or assistive vehicle functionality to accurately perform on-road localization. Conventionally, these local landmarks have been detected and identified from camera images or sensor data from other sensors obtained by one or more cameras/sensors located on-vehicle. For example, it has been conventionally discussed to combine GPS data with data collected from front view cameras and LiDAR, and, even data generated by ground penetration radar. In addition, it has been discussed that there is utility for such cameras to extract a reduced feature presentation of roadway characteristics from on-vehicle cameras to generate data indicating roadside patterns that may be analyzed to perform on-road localization. Machine learning algorithms, such as neural networks, and models developed thereby, facilitate the combination and operational utilization of the various data inputs, including camera images, to provide autonomous and/or assistive functionality, and, more particularly, to develop predicted paths for the transportation vehicle along the roadway.

Disclosed embodiments are based on a recognition that recent autonomous vehicle traffic accidents provide evidence that there is a technical and real-world need to increase the robustness and/or reliability of algorithms that govern autonomous and/or assistive functionality; particularly, in scenarios that occur less frequently and/or require more significant reactionary measures from the systems enabling the autonomous and/or assistive functionality and controlling travel of transportation vehicles.

Autonomous and/or assistive functionality comprises two broad functional systems or modules: a path planning system and a control and/or assistance system. The path planning system receives and processes sensor inputs and other information to determine steering, braking, acceleration, etc. for the transportation vehicle. The control and/or assistance system implements a path planned out by the path planning system through fully or partially automated steering, braking, acceleration, and/or monitoring of vehicle surroundings.

During the training and testing of autonomous and/or assistive functionality, it may be helpful to identify corner cases (i.e., situations wherein the prediction of the path planning system deviates from the actions taken by a human driver) and/or other error states or indicators. A common testing strategy for a path planning system is called Shadow Mode and/or shadowing. When Shadow Mode is engaged, the autonomous and/or assistive functionality system is operational in the background and performs the predictive functions thereof but does not act upon the predictive functions to command operation of the transportation vehicle. Further, during engagement in Shadow Mode, a human driver is fully responsible for operating the transportation vehicle. Therefore, because the path planning system provides predictions for the same driving conditions experienced by the driver currently operating the transportation vehicle, a comparison may be performed between the predictions and the actions of the human driver.

Figure 4:
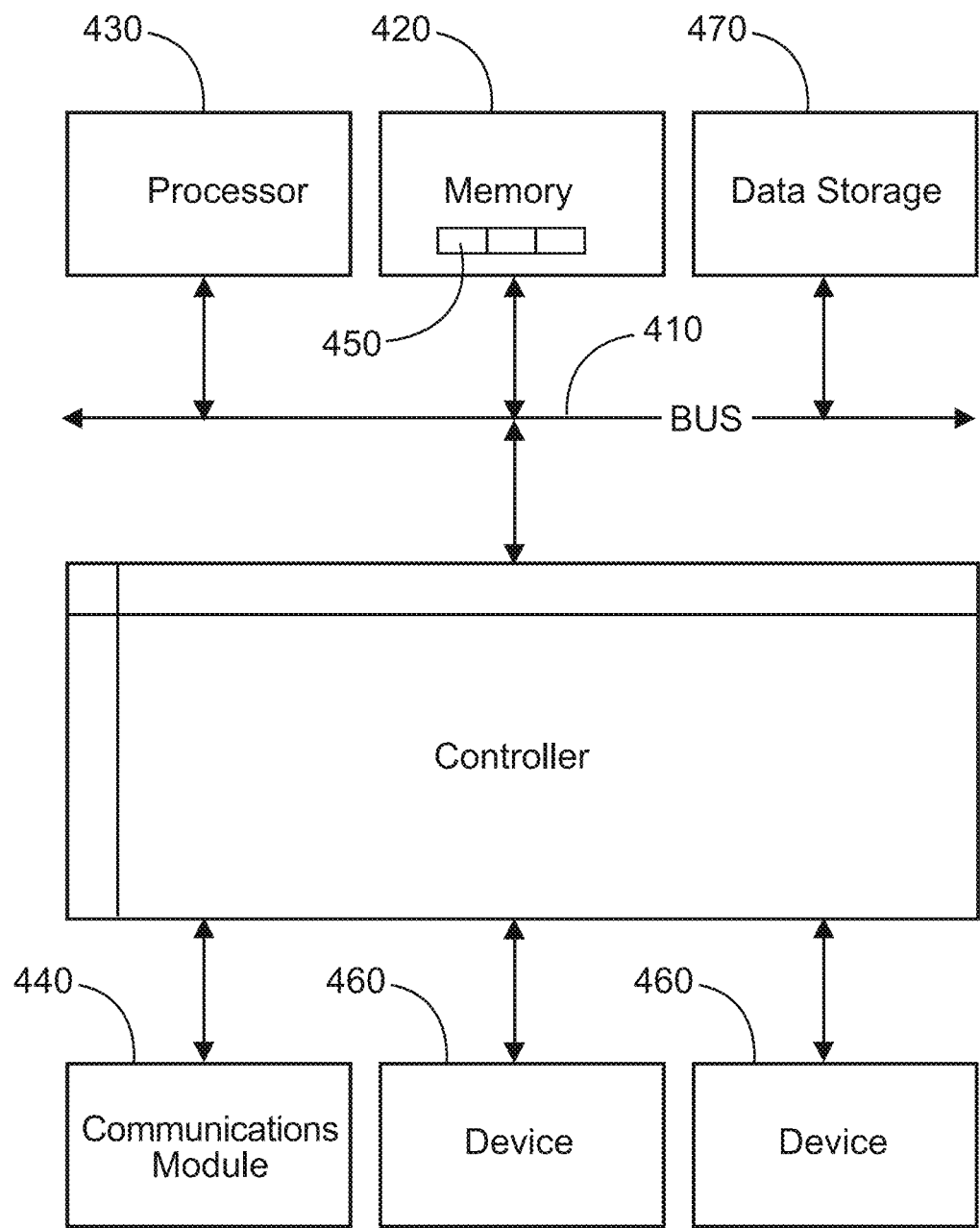
FIG. 4 illustrates computing resources for performing error detection for a path predicting neural network and storage of error case information in accordance with the present disclosure.

Such a comparison may then identify when the prediction of the path planning system deviates from the actions of the human driver by more than a predefined threshold. When the predefined threshold is surpassed, an error (i.e., a corner case) is triggered and data associated with the error is stored in semi-permanent storage/memory 470 (see FIG. 4). Semi-permanent storage may be one or more memory modules disposed amongst equipment of the transportation vehicle, such as a hard drive, and/or semi-permanent storage may include transmission of the error data to cloud storage via a mobile or wireless connection through a communications module 440 (see FIG. 4). The error data is stored so that said error data may be used for troubleshooting the predictive algorithm and path planning system thereafter. A data collection strategy that only stores corner case/error data may be an improvement because it reduces the amount of data storage needed as compared with a data collection strategy that stores all predictive data and all data describing the associated human driver operation. This improvement is further emphasized when the autonomous and/or assistive functionality operates with a relatively low error rate such that errors rarely occur or rarely surpass the error threshold, thus resulting in limited (and reduced) data storage and/or transmission.

Figure 3:
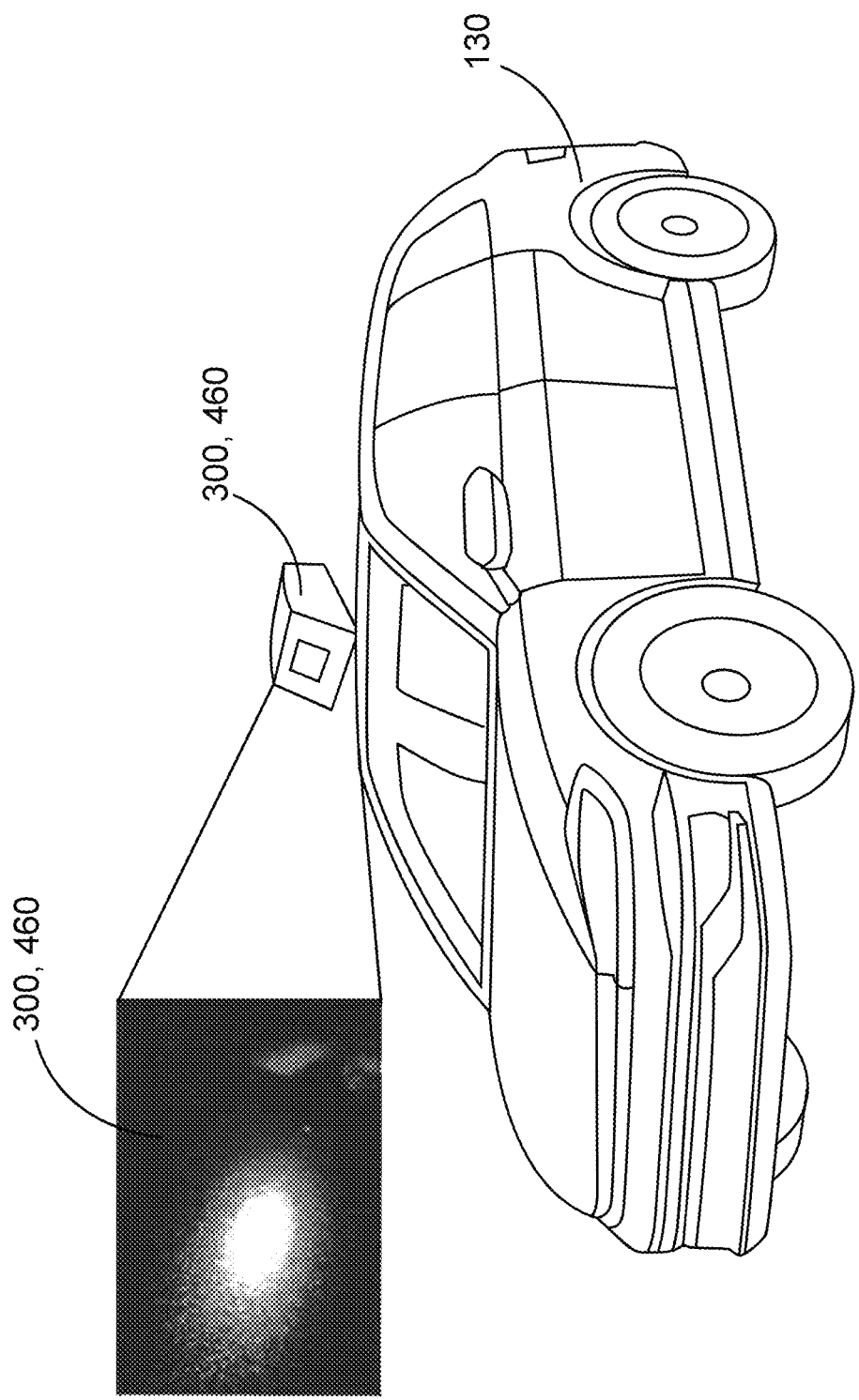
FIG. 3 illustrates an example of a system and constituent components for performing image data acquisition and error capture and storage in memory in accordance with the present disclosure.

Particularly, the path planning system in the form of a neural network 110 (see FIG. 1) is tasked to predict a 30-meter path 120 for the transportation vehicle 130 (see FIG. 3) from an image of the roadway. The predicted path 120 is compared to a reference path 140 corresponding to the path that a human driver in the same scenario drives the transportation vehicle 130 over the succeeding 30 meters following the image used in the prediction. The path planning system may be evaluated based on this comparison (i.e., the less deviation between the predicted path 120 and the reference path 140, the more accurate the path planning system may be considered for training purposes. It is contemplated in this disclosure that the corner case/error detection and collection for path planning systems captures three types of error: deviation from reference, temporal instability, and ensemble uncertainty.

For each of the prediction paths 120 generated by path planning system, a comparison to the corresponding reference path 140 generated by the human driver calculates deviation. The comparison operation may be performed according to increments delineated by image, time, distance, and/or another suitable unit. For example, the predicted path 120 may be updated each meter of travel or with the acquisition of each new roadway image. However, the reference path 140 does not become available simultaneously with the predicted path 120. Instead, the reference path 140 is not available until after the transportation vehicle 130 travels along the reference path 140 determined by a human driver and undergoes the effects of the environmental and road conditions. First, a human driver performs the driving actions that correspond with the reference path 140, and then the transportation vehicle 130 responds to the driving actions of the human driver and the other conditions that affect the reference path 140 of the transportation vehicle 130.

Neural network prediction, such as that employed by the path planning system, may take tens of milliseconds on dedicated hardware. The reference path 140 shown in FIG. 1 spans 30 meters with a gentle curve. In this example, the transportation vehicle 130 traverses the reference path 140 in 5 seconds when the transportation vehicle 130 travels at 15 miles per hour (i.e. relatively slow). Furthermore, the transportation vehicle 130 traverses the reference path 140 in 1 second when traveling at 70 miles per hour (i.e. relatively fast). As a result of variation in operation of the transportation vehicle 130, the reference path 140 may become available between less than 1 second and greater than 5 seconds after the predicted path 120 is generated. The delay may be even longer when the transportation vehicle 130 moves more slowly than the exemplary range previously discussed. Memory management is important for storing information for numerous of the prediction paths 120 and the associated reference paths 140 observed following a significant delay.

In disclosed embodiments, the path planning system may comprise the deep neural network 110 shown in FIG. 1. The reference path 140 is generated by running a physics model within a memory 420 and a processor 430 (see FIG. 4) disposed onboard the transportation vehicle 130 and communicatively connected with one or more sensor devices 460 (e.g. a camera 300) by a controller area network (CAN) 410. The physics model may receive as input parameters one or more signals from a CAN bus 410 including, but not limited to, vehicle speed, acceleration, angular speed, wheel tick count, etc. As noted hereinabove, the reference path 140 may be delayed by a time period (on the order of seconds) as compared with availability of the prediction path 120. In disclosed example embodiments, following generation of the prediction path 120, information describing the prediction path 120 is stored in the memory 420 and the processor 430 waits for the corresponding reference path 140 before generating a comparison. If a deviation is detected greater than the predetermined threshold, then the relevant data is transferred into semi-permanent storage 470 (see FIG. 4).

In order to store image data, CAN bus data (e.g., sensor reading), and other continuously collected or streaming data, one or more ring buffer 450 may be implemented in the memory 420. In an example embodiment, first and second ring buffers each comprise three modules of memory wherein each memory module stores up to 5 seconds of collected data. The 5 seconds of collected data may comprise 5 seconds of images or 5 seconds of CAN bus signals. The first, second, and third memory modules are filled consecutively. Then, after the third memory module is filled, the first memory module is cleared and new data is stored therein. This storage protocol continues, one memory module after the next, on a continuous basis to implement the ring buffers 450. Therefore, at a given instant, each of the one or more ring buffers 450 has stored thereon data describing the previous 10-15 seconds of driving activity. The physics model for calculating the reference path 140 likewise runs continuously in Shadow Mode so that corner cases and/or errors in the prediction paths 120 may be detected.

When the prediction path 120 deviates beyond the threshold from the reference path 140 an error is detected, as noted previously, and a data collection function is triggered. After triggering of the collection function, the memory 420 waits for the current memory module and the subsequent memory module in the ring buffer 450 to be filled. Then, all data stored in the ring buffer 450 is transmitted to semi-permanent storage. Therefore, data describing the error as well as data describing the preceding 5 seconds and the succeeding 5 seconds is placed in semi-permanent storage so as to inform troubleshooting efforts with before and after context for the subject error.

Corner cases and error detection may involve more than deviation between the prediction path 120 and the corresponding reference path 140. Even if a series of the prediction paths 120, produced for consecutive frames of roadway images, generated by the path planning system yield deviations from the associated reference paths 140 that are smaller than the error threshold, such prediction paths 120 may still collectively exhibit temporal instability. Temporal instability may be registered as an error for the purpose of controlling and developing the path planning system. For example, referring now to FIG. 2, at a first time increment 200, a predicted path 120a tilts slightly right (when the transportation vehicle 130 moves left to right across this illustrated example) from a corresponding reference path 140a. Then, at a second time increment 210, the predicted path 120b tilts slightly left from the corresponding reference path 140b. And again, at a next time increment 220, the predicted path 120c has more pronounced left and right in-path movement than the associated reference path 140c. The reference paths 140a, b, c, over the consecutive time increments 200, 210, 220, are expected to smoothly extend from the preceding reference path 140a, b to the next reference path 140b, c, respectively, because the transportation vehicle 130 moves continuously along each of the reference paths 140a, 140b, 140c and does not jump from one to the next. It follows that, even though, taken individually, the predicted paths 120a, 120b, 120c of FIG. 2 do not exhibit deviation from the corresponding reference paths 140a, 140b, 140c beyond the error threshold, the cumulative deviation developed over time represents an error by the path planning system.

Figure 2:
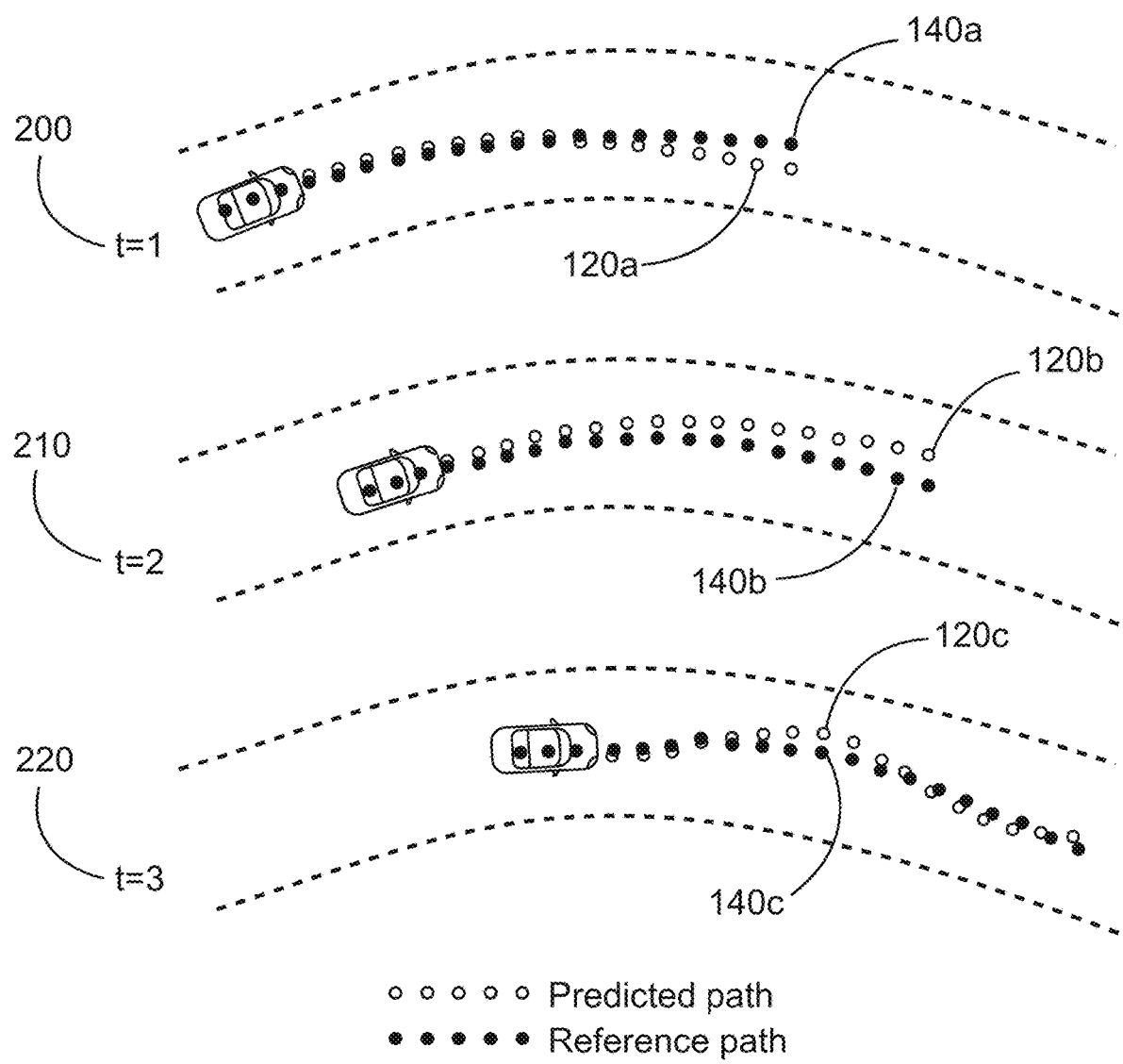
FIG. 2 illustrates a comparison of predicted paths and reference paths, driven by a human, over a series of time periods.

Referring still to FIG. 2, the temporal instability corner case may be detected from the prediction paths 120a, 120b, 120c taken collectively but omitting the associated reference paths 140a, 140b, 140c. As noted above, the reference paths 140a, b, c, over the consecutive time increments 200, 210, 220, are expected to smoothly extend from the preceding reference path 140a, b to the next reference path 140b, c because the transportation vehicle 130 moves continuously along each of the reference paths 140a, 140b, 140c and does not step from one to the next path. This quality of the movement of the transportation vehicle 130 may be described by a smoothness metric. A smoothness metric with the same parameters may be applied to evaluate the accuracy of the prediction paths 120a, 120b, 120c over a temporal framework. A series of the prediction paths 120 should similarly adhere to a predetermined smoothness value, and the smoothness metric of the series of the prediction paths 120 may indicate deviation from the predetermined smoothness value. Deviation of the smoothness metric from the predetermined smoothness value may indicate a corner case and register an error when testing the path planning system.

According to an example embodiment, a particular point along the series of prediction paths 120a, b, c, . . . n, is selected (e.g., 2 seconds) and fit with a low-order polynomial curve (e.g., a $2^{nd}$ order polynomial). Preferably, the selected point is within the shared distance wherealong the 30 feet comprising each of the prediction paths 120 overlap. The root mean square error for this curve fitting operates as a smoothness measure for the selected point (i.e., for the selected instant in time) along the series of prediction paths 120n. Further, a weighted sum of all the smoothness measures for each available point in time may be generated as an overall smoothness metric for evaluating temporal instability.

Still further, corner case errors may be associated with ensemble uncertainty. An ensemble uncertainty value describes a certainty measure associated with the predicted path 120 generated by the path planning system. In particular, measuring and communicating how certain the path planning system is in the prediction paths 120 generated thereby may be important information for overall safety of the transportation vehicle 130. One way to obtain such an ensemble uncertainty metric is to operate a plurality of path planning algorithms (i.e., an ensemble of algorithms) simultaneously as a component of autonomous and/or assistive functionality. The plurality of path planning algorithms may independently generate a plurality of predictions in parallel. These plurality of path planning algorithms may be completely independent or partially inter-dependent. The variance of the prediction paths 120 generated by the plurality of path planning algorithms may function as an ensemble uncertainty measure. As with previously discussed corner cases, if the ensemble uncertainty measure exceeds a predetermined threshold (i.e., the variance between the prediction paths generated by the plurality of path planning algorithms exceeds the predetermined threshold) then an error is registered with the path planning system for purposes of evaluation and improvement thereof. Further, in example embodiments, the plurality of parallel path predictions may be generated from the same neural network through dropout sampling, whereby numerous predictions are made by the neural network and each prediction omits (or drops out) one or more input from the neural network such that flawed or inaccurate inputs may be identified.

Neural networks, such as those improved by the embodiments disclosed herein, may be built and adapted with the goal of facilitating operation thereof, in this case autonomous and/or assistive functionality, with all types of inputs spanning an input domain of the model (e.g., all roadway circumstances and conditions). Systems and methodologies provided in accordance with the disclosed embodiments may be useful for developing autonomous and/or assistive functionality, such as when a neural network predicts a path of a vehicle across approximately the next 30 meters for every image. Optionally, in addition, supervised learning, which is the most common form of machine learning, involves enabling learning during a training phase based on a set of training data so as to enable the ability to learn to recognize how to label input data for categorization. Deep learning improves upon the supervised learning approach by considering several levels of representation, in which every level uses the information from a previous level to learn more deeply. Deeper architectures of many stacked layers is one aspect, also Convolutional Neural Networks (CNNs) take into account 2D/3D local neighborhood relations in pixel/voxel space by convolution over spatial filters.

Supervised deep learning involves the application of multiple levels, or phases, of functional operations to improve understanding of resulting data then fed into further functional operations. For example, supervised deep learning for classification of data into one or more categories may be performed, for example, by performing feature learning (involving one or more phases of convolutions, Rectifier Linear Units (ReLUs) and pooling) to enable subsequent classification of sample data to identify learned features by application of a softmax function to enable differentiation between objects and background in the input image data. These operations may be performed to generate image class labels for classification purposes.

Likewise, supervised deep learning operations may be performed for regression by operating in parallel on Red Green Blue (RGB) image and distance to ground/disparity map data by performing multiple convolutions and joining the result through concatenation for subsequent processing. These operations may be performed to generate image regression labels for subsequent use in analysis.

Moreover, supervised deep learning operations may be performed for semantic segmentation by inputting RGB image data into a convolutional encoder/decoder that may include multiple stages of convolution, batch normalization (which does not only apply to segmentation but applies to other networks as well), ReLUs and pooling, followed by multiple phases of convolution, batch normalization and ReLUs with upsampling. The resulting data may then be processed by application of a softmax function to provide output data with segmentation labelling for each pixel.

Further, it should be understood that, although the disclosed embodiments may be utilized for the purposes of facilitating robust autonomous and/or assistive transportation vehicle functionality generally, the disclosed embodiments may have particular utility in improving that functionality when lane markings are obscured as a result of weather conditions such as snow. In such conditions, drivers often take actions that appear out of the ordinary. The comparison of the driver-directed path to the planned path is useful in further improving the neural networks providing the path planning functionality.

In this regard, it should be understood that at least one embodiment may include a feedback mechanism that determines the quantity and/or quality of data produced and/or analyzed in the disclosed operations. This may be implemented, for example, by dynamically weighting data. It should also be understood that such a feedback mechanism may include comparison with threshold values for maintaining at least minimum parameters to ensure safety for autonomous and/or assistive functionality operation. Further it should be understood that a mechanism for dynamically weighting such data may be performed in one or more of various conventionally known techniques that enable Sensor Data Fusion, for example, using a Kalman Filter, processing performed based on the central limit theorem, Bayesian networks, the Dempster-Shafer theorem, CNNs or any of the other mathematical operations disclosed herein.

As explained above, disclosed embodiments may be implemented in conjunction with components of autonomous and/or assistive driving systems included in transportation vehicles. Thus, the utility of the disclosed embodiments within those technical contexts has been described in detail. However, the scope of the innovative concepts disclosed herein is not limited to those technical contexts. Additionally, it should be understood that the presently disclosed means for evaluating the one or more predicted paths to detect one or more error in the predicting operation may comprise any combination of the sensors and functionality disclosed herein implemented in hardware and/or software to provide the disclosed functionality.

Moreover, it should be understood that such assistive technology may include but is not limited to what may have been conventionally termed a Driver Assistance System (DAS) or an Advanced Driver Assistance System (ADAS) implemented using hardware and software included in a transportation vehicle. These conventionally known systems assist the driver in decision and control, but inevitably the decisions and control are the responsibility of the driver. Further, these systems can be either "active" or "passive" in how they are implemented. Active DAS means that the vehicle itself controls various longitudinal and/or lateral aspects of the vehicle's driving behavior, or rather, very specific driving tasks, through its sensors, algorithms, processing systems, and actuators. Passive DAS means that the vehicle will simply assist the driver, through its sensors, algorithms, processing systems, and human-machine interfaces (HMIs) with controlling various longitudinal and/or lateral aspects of vehicle control. For example, in a collision avoidance situation an active system would bring the vehicle to a stop or route the vehicle around the obstacle in the immediate path. A passive system would provide some type of visual, auditory, and haptic cues to the driver to stop or route the vehicle around the obstacle.

Thus, a DAS system helps the driver with many tasks ingrained into the driving process and implemented specifically for the purpose to increase car and road safety, as well as driver convenience. Such DAS systems include, but are not limited to cruise control, Adaptive Cruise Control (ACC), active steering for lane keeping, lane change assistance, highway merge assistance, collision mitigation and avoidance systems, pedestrian protection systems, automated and/or assistive parking, sign recognition, blind spot detection for collision mitigation, and stop and go traffic assistance. Accordingly, the disclosed embodiments may assist in identifying inaccurate data gathered by DAS systems to provide this assistive functionality.

While the functionality of the disclosed embodiments and the system components used to provide that functionality have been discussed with reference to specific terminology that denotes the function to be provided, it should be understand that, in implementation, the component functionality may be provided, at least in part, components present and known to be included in conventional transportation vehicles.

For example, as discussed above, disclosed embodiments use software for performing functionality to enable measurement and analysis of data, at least in part, using software code stored on one or more non-transitory computer readable mediums running on one or more processors in a transportation vehicle. Such software and processors may be combined to constitute at least one controller coupled to other components of the transportation vehicle to support and provide autonomous and/or assistive transportation vehicle functionality in conjunction with vehicle navigation systems, and multiple sensors. Such components may be coupled with the at least one controller for communication and control via a CAN bus of the transportation vehicle. It should be understood that such controllers may be configured to perform the functionality disclosed herein.

It should further be understood that the presently disclosed embodiments may be implemented using dedicated or shared hardware included in a transportation vehicle. Therefore, components of the module may be used by other components of a transportation vehicle to provide vehicle functionality without departing from the scope of the invention.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. In some illustrative embodiments, well-known processes, well-known device structures, and well-known technologies are not described in detail.

Terminology has been used herein for the purpose of describing particular illustrative embodiments only and is not intended to be limiting. The singular form of elements referred to above may be intended to include the plural forms, unless the context indicates otherwise. The method processes, and operations described herein are not to be construed as necessarily requiring their performance in the particular order discussed or illustrated, unless specifically identified as an order of performance or a particular order is inherently necessary for embodiment to be operational. It is also to be understood that additional or alternative operations may be employed.

Disclosed embodiments include the methods described herein and their equivalents, non-transitory computer readable media programmed to carry out the methods and a computer system configured to carry out the methods. Further, included is a vehicle comprising components that include any of the methods, non-transitory computer readable media programmed to implement the instructions or carry out the methods, and systems to carry out the methods. The computer system, and any sub-computer systems will typically include a machine readable storage medium containing executable code; one or more processors; memory coupled to the one or more processors; an input device, and an output device connected to the one or more processors to execute the code. A machine-readable medium may include any mechanism for storing or transmitting information in a form readable by a machine, such as a computer processor. The information may be stored, for example, in volatile or non-volatile memory. Additionally, embodiment functionality may be implemented using embedded devices and online connection to cloud computing infrastructure available through radio connection (e.g., wireless communication) with such infrastructure. The training data sets, image data, and/or transformed image data may be stored in one or more memory module of the memory coupled to the one or more processors.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The embodiment(s) detailed hereinabove may be combined in full or in part, with any alternative embodiment(s) described.

The invention claimed is:

1. Transportation vehicle equipment for detecting errors in a path predicting neural network, the equipment being disposed on the transportation vehicle and comprising:
   one or more sensors for acquiring data describing a roadway and a reference path taken by the transportation vehicle;
   a processor and memory comprising a ring buffer for continuously storing data from the one or more sensors and a semi-permanent memory;
   at least one neural network for predicting one or more predicted paths for the transportation vehicle;
   wherein the processor is configured as a means for evaluating the one or more predicted paths to detect one or more errors in a predicting operation wherein the one or more errors include an indication that the one or more predicted paths of a path planning system deviate from the reference path; and
   wherein, responsive to detection of the one or more errors in the predicting operation, data are transmitted from the ring buffer to the semi-permanent memory and wherein the data transmitted from the ring buffer to the semi-permanent memory includes a first portion of data corresponding to a period of time before the detected error and a portion of data corresponding to a period of time after the detected error.

2. The transportation vehicle equipment of claim 1, wherein the means for evaluating compares the one or more predicted paths to the reference path.

3. The transportation vehicle equipment of claim 2, wherein the means for evaluating detects deviation of the one or more predicted paths from the reference path.

4. The transportation vehicle equipment of claim 3, further comprising memory for storing data describing the one or more predicted paths and the reference path.

5. The transportation vehicle equipment of claim 1, wherein the means for evaluating determines a smoothness metric from the one or more predicted paths.

6. The transportation vehicle equipment of claim 5, wherein the one or more predicted paths comprises a plurality of predicted paths, and wherein the smoothness metric is based in part on a comparison of the plurality of predicted paths to one another.

7. The transportation vehicle equipment of claim 1, wherein the one or more predicted path comprises a plurality of predicted paths, and wherein the plurality of predicted paths are generated by more than one neural network.

8. The transportation vehicle equipment of claim 1, wherein the one or more predicted path comprises a plurality of predicted paths, and wherein the plurality of predicted paths are generated by one neural network according to dropout sampling.

9. The transportation vehicle equipment of claim 7, wherein the means for evaluating compares the plurality of predictive paths and detects variance between the plurality of predictive paths to measure an uncertainty value.

10. The transportation vehicle equipment of claim 8, wherein the means for evaluating compares the plurality of predictive paths and detects variance between the plurality of predictive paths to measure an uncertainty value.

11. A method of error detection for a path predicting neural network, the method comprising:
   analyzing data describing a roadway acquired by one or more sensors disposed on a transportation vehicle;
   predicting with at least one neural network, disposed on a transportation vehicle, one or more predicted paths for the transportation vehicle;
   acquiring data describing a reference path taken by the transportation vehicle;
   evaluating the one or more predicted paths to detect one or more errors in the predicting operation wherein the one or more errors include an indication that the one or more predicted paths of the path planning system deviate from the reference path; and transmitting data, responsive to detection of the one or more errors in the predicting operation, from a ring buffer for continuous storage of data of the one or more sensors to a semi-permanent memory, wherein the data transmitted from the ring buffer to the semi-permanent memory includes a first portion of data corresponding to a period of time before the detected error and a portion of data corresponding to a period of time after the detected error.

12. The method of error detection for the path predicting neural network of claim 11, further comprising comparing the one or more predicted paths to the reference path.

13. The method of error detection for the path predicting neural network of claim 12, further comprising detecting deviation of the one or more predicted paths from the reference path.

14. The method of error detection for the path predicting neural network of claim 13, further comprising storing data describing the one or more predicted paths and the reference path.

15. The method of error detection for the path predicting neural network of claim 11, further comprising determining a smoothness metric from the one or more predicted paths.

16. The method of error detection for the path predicting neural network of claim 15, wherein the one or more predicted path comprises a plurality of predicted paths, and wherein the smoothness metric is based at least in part on a comparison of the plurality of predicted paths to one another.

17. The method of error detection for the path predicting neural network of claim 11, wherein the one or more predicted path comprises a plurality of predicted paths, and wherein the plurality of predicted paths are generated by more than one neural network.

18. The method of error detection for the path predicting neural network of claim 11, wherein the one or more predicted path comprises a plurality of predicted paths, and wherein the plurality of predicted paths are generated by the neural network.

19. The method of error detection for the path predicting neural network of claim 18, wherein the plurality of predicted paths are generated by the neural network according to dropout sampling.

20. The method of error detection for the path predicting neural network of claim 17, further comprising comparing the plurality of predictive paths, and detecting variance between the plurality of predictive paths to measure an uncertainty value.

21. The method of error detection for the path predicting neural network of claim 18, further comprising comparing the plurality of predictive paths, and detecting variance between the plurality of predictive paths to measure an uncertainty value.

22. A computing system for planning a path of a transportation vehicle, the system disposed on the transportation vehicle and comprising:
at least one memory configured to receive sensor data indicative of a reference path for the vehicle;
at least one processor communicatively coupled to the at least one memory, wherein the at least one processor is configured to execute program instructions to cause the system to perform the steps comprising:
predicting one or more predicted paths for the transportation vehicle by at least one neural network;
detecting a deviation from the one or more predicted paths;
determining a corner case based on the reference path and the detected deviation;
storing the corner case, wherein storing includes transmitting data, responsive to detection of the one or more errors in the predicting operation, from a ring buffer of the at least one memory for continuous storage of data of the one or more sensors to a semi-permanent memory of the at least one memory, wherein the data transmitted from the ring buffer to the semi-permanent memory includes a first portion of data corresponding to a period of time before the detected error and a portion of data corresponding to a period of time after the detected error; and
training the at least one neural network with the stored corner case.

* * * * *